United States Patent
Yang et al.

(10) Patent No.: US 12,491,502 B2
(45) Date of Patent: Dec. 9, 2025

(54) PREPARATION OF SCR CATALYST COMPRISING CU AND FE-EXCHANGED ZEOLITE, SAID CATALYST, SYSTEM COMPRISING SAID CATALYST AND EXHAUST GAS TREATMENT USING SUCH

(71) Applicant: BASF Corporation, Florham Park, NJ (US)

(72) Inventors: Jeff H. Yang, Iselin, NJ (US); Wen-Mei Xue, Iselin, NJ (US); Stanley A. Roth, Yardley, PA (US)

(73) Assignee: BASF Corporation, Florham Park, NJ (US)

( * ) Notice: Subject to any disclaimer, the term of this patent is extended or adjusted under 35 U.S.C. 154(b) by 60 days.

(21) Appl. No.: 18/266,024

(22) PCT Filed: Dec. 8, 2021

(86) PCT No.: PCT/EP2021/084729
§ 371 (c)(1),
(2) Date: Jun. 8, 2023

(87) PCT Pub. No.: WO2022/122796
PCT Pub. Date: Jun. 16, 2022

(65) Prior Publication Data
US 2024/0033717 A1    Feb. 1, 2024

(30) Foreign Application Priority Data
Dec. 9, 2020    (EP) .................................... 20212708

(51) Int. Cl.
*B01J 29/76*    (2006.01)
*B01D 53/94*    (2006.01)
(Continued)

(52) U.S. Cl.
CPC ........ *B01J 29/763* (2013.01); *B01D 53/9418* (2013.01); *B01D 53/944* (2013.01);
(Continued)

(58) Field of Classification Search
CPC ...... F01N 3/035; F01N 3/0814; F01N 3/0842; F01N 3/106; F01N 3/206; F01N 3/2066;
(Continued)

(56) References Cited

U.S. PATENT DOCUMENTS 9,486,792 B2    11/2016   Mohanan et al.
2010/0322847 A1*    12/2010    Xiao ...................... B01J 35/617
                                                                    423/709
(Continued)

FOREIGN PATENT DOCUMENTS

EP            3549913 A1    10/2019
WO    2011/064186 A1    6/2011
(Continued)

OTHER PUBLICATIONS

Yang, Xiaofan et al., "Heterometal Incorporation in Metal-Exchanged Zeolites Enables Low-Temperature Catalytic Activity of NOx Reduction", The Journal of Physical Chemistry C, vol. 116, No. 44, Nov. 8, 2012,, pp. 23322-23331.
(Continued)

Primary Examiner — Binh Q Tran
(74) Attorney, Agent, or Firm — DLA Piper LLP (US)

(57) ABSTRACT

The present disclosure relates to a process for preparing a catalyst for the selective catalytic reduction of nitrogen oxide. The process includes providing a zeolitic material including $SiO_2$ and $X_2O_3$ in its framework structure, wherein X is a trivalent element; subjecting the zeolitic material to an ion exchange procedure with one or more iron (II) and/or iron (III) containing compounds; preparing a slurry including the Fe ion-exchanged zeolitic material, one or more
(Continued)

copper (II) containing compounds, and a solvent system; providing a substrate and coating the slurry onto the substrate; and calcining the coated substrate. Furthermore, the present disclosure relates to a catalyst for the selective catalytic reduction of nitrogen oxide, an exhaust gas treatment system for the treatment of exhaust gas exiting from an internal combustion engine, and a method for the selective catalytic reduction of nitrogen oxides.

15 Claims, 1 Drawing Sheet

(51) Int. Cl.
*B01J 29/03* (2006.01)
*B01J 29/035* (2006.01)
*B01J 35/56* (2024.01)
*B01J 37/02* (2006.01)
*B01J 37/30* (2006.01)
*F01N 3/035* (2006.01)
*F01N 3/08* (2006.01)
*F01N 3/10* (2006.01)
*F01N 3/20* (2006.01)
*F01N 3/28* (2006.01)
*F01N 13/00* (2010.01)

(52) U.S. Cl.
CPC .......... *B01D 53/9477* (2013.01); *B01J 35/56* (2024.01); *B01J 37/0219* (2013.01); *B01J 37/30* (2013.01); *F01N 3/035* (2013.01); *F01N 3/106* (2013.01); *F01N 3/2066* (2013.01); *F01N 3/2828* (2013.01); *F01N 13/009* (2014.06); *B01D 53/9422* (2013.01); *B01D 2255/20738* (2013.01); *B01D 2255/20761* (2013.01); *B01D 2255/50* (2013.01); *B01D 2257/404* (2013.01); *B01D 2258/01* (2013.01); *B01J 29/0333* (2013.01); *B01J 29/0352* (2013.01); *B01J 29/76* (2013.01); *B01J 29/7615* (2013.01); *B01J 2229/186* (2013.01); *B01J 2229/42* (2013.01); *F01N 3/0814* (2013.01); *F01N 3/0842* (2013.01); *F01N 3/208* (2013.01); *F01N 2370/04* (2013.01); *F01N 2510/068* (2013.01)

(58) Field of Classification Search
CPC ...... F01N 3/208; F01N 3/2828; F01N 13/009; F01N 2330/06; F01N 2370/04; F01N 2510/063; F01N 2510/068; F01N 2510/0684; F01N 2570/14; F01N 2570/143; B01J 21/08; B01J 29/0333; B01J 29/0352; B01J 29/72; B01J 29/76; B01J 29/7615; B01J 29/763; B01J 29/80; B01J 35/19; B01J 35/56; B01J 37/0215; B01J 37/0219; B01J 37/0228; B01J 37/0236; B01J 37/0246; B01J 37/04; B01J 37/088; B01J 37/30; B01J 2029/062; B01J 35/00; B01J 35/30; B01J 29/46; B01J 37/038; B01J 2229/186; B01J 2229/42; B01D 53/9418; B01D 53/9422; B01D 53/944; B01D 53/9477; B01D 53/9472; B01D 2255/20738; B01D 2255/20761; B01D 2255/50; B01D 2255/502; B01D 2255/504; B01D 2255/911; B01D 2255/9155; B01D 2251/2067; B01D 2258/012; B01D 2257/404; B01D 2258/01; Y02C 20/10; Y02T 10/12

See application file for complete search history.

(56) References Cited

U.S. PATENT DOCUMENTS

| | | |
|---|---|---|
| 2011/0305614 A1 | 12/2011 | Stiebels et al. |
| 2011/0313226 A1* | 12/2011 | Yilmaz ................ C10G 3/49 423/709 |
| 2015/0165422 A1 | 6/2015 | Sung et al. |
| 2016/0325228 A1* | 11/2016 | Feyen ............... B01D 53/9418 |
| 2017/0348678 A1* | 12/2017 | Davis ..................... C07C 1/20 |
| 2018/0078926 A1* | 3/2018 | Chen .................. B01D 53/944 |
| 2019/0275504 A1* | 9/2019 | Martín García ......... B01J 37/10 |
| 2019/0322537 A1* | 10/2019 | Kim ........................ B01J 37/04 |
| 2021/0162385 A1* | 6/2021 | Parvulescu .......... B01J 29/7065 |

FOREIGN PATENT DOCUMENTS

| | | |
|---|---|---|
| WO | 2015/101930 A1 | 7/2015 |
| WO | 2016/070090 A1 | 5/2016 |
| WO | 2017/134581 A1 | 8/2017 |
| WO | 2017/153984 A1 | 9/2017 |
| WO | 2018/010718 A1 | 1/2018 |

OTHER PUBLICATIONS

Sultana, Asmina et al., "Tuning the NOx conversion of CU—Fe/ZSM-5 catalyst in MH3-SCR", *Catalysis Communications*, vol. 41, Jul. 5, 2013, pp. 21-25.

Jouini, Houda et al., "Characterization and NH3-SCR reactivity of Cu—Fe-ZSM-5 catalysts prepared by solid state ion exchange: The metal exchange order effect", *Microporous and Mesoporous Materials*, vol. 260, Oct. 28, 2017, pp. 217-226.

International Search Report and Written Opinion from corresponding PCT International Patent Application No. PCT/EP2021/084729 dated Apr. 22, 2022.

Yang, Xiaofan et al., "Heterometal Incorporation in Metal-Exchanged Zeolites Enables Low-Temperature Catalytic Activity of NOx Reduction" Supporting Information, *The Journal of Physical Chemistry C*, vol. 116, No. 44, Nov. 8, 2012, pp. 1-23.

International Preliminary Report on Patentability and Written Opinion, from corresponding International Application No. PCT/EP2021/084729, dated Jun. 13, 2023.

China Association for Science and Technology, et al.: "2016-2017 Report on the Development of Rare Earth Science and Technology," Beijing: China Science and Technology Press, p. 161, Mar. 31, 2018, and a machine generated translation.

* cited by examiner

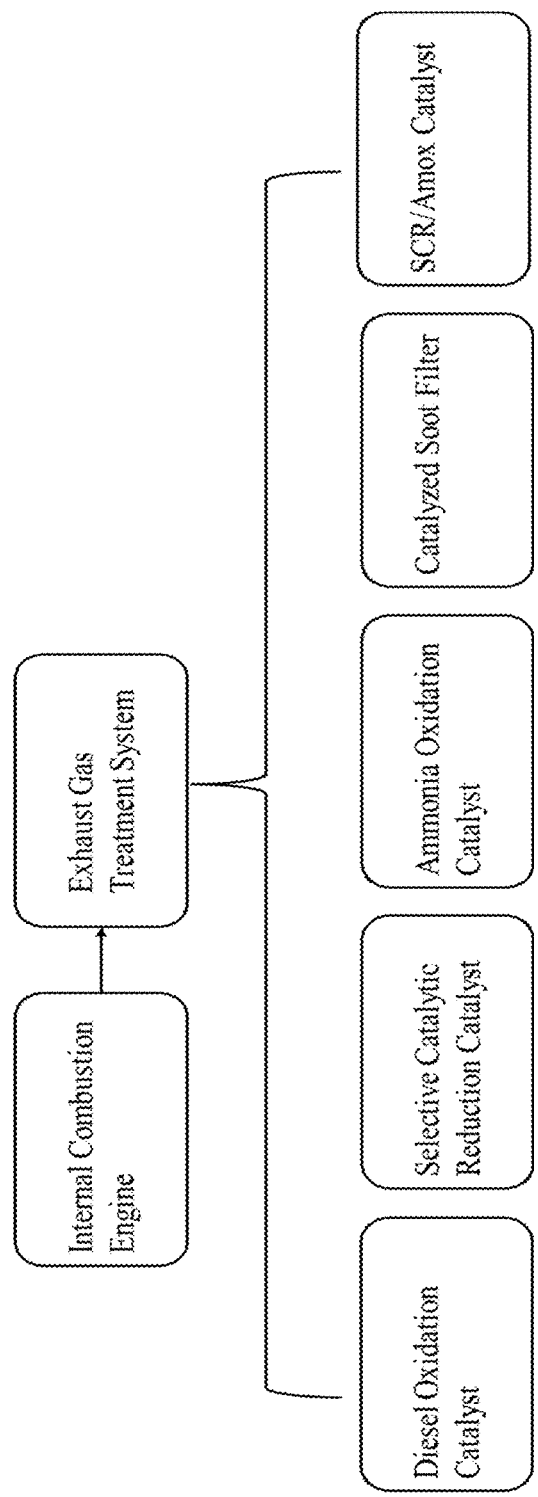

PREPARATION OF SCR CATALYST COMPRISING CU AND FE-EXCHANGED ZEOLITE, SAID CATALYST, SYSTEM COMPRISING SAID CATALYST AND EXHAUST GAS TREATMENT USING SUCH

TECHNICAL FIELD

The present invention relates to a process for preparing a catalyst for the selective catalytic reduction of nitrogen oxide as well as to a catalyst for the selective catalytic reduction of nitrogen oxide obtained according to the inventive process and to its use. Furthermore, the present invention relates to an exhaust gas treatment system for the treatment of exhaust gas exiting from an internal combustion engine, preferably from a diesel engine, the system comprising a catalyst for the selective catalytic reduction of nitrogen oxide according to the present invention. Finally, the present invention relates to a method for the selective catalytic reduction of nitrogen oxides which employs a catalyst for the selective catalytic reduction of nitrogen oxide according to the present invention.

INTRODUCTION

As a trend, the NOx engine out emissions of modern heavy duty diesel engines will increase due to the making of a more fuel efficient engine, and at the same time, the NOx conversion requirements of after-treatment systems will increase. For some engines, NOx conversions of more than 95% are already mandatory. At the same time, it becomes more challenging to fulfill the nitrous oxide ($N_2O$) targets as these targets are in the range of 0.1 to 0.14 g/kWh. Therefore, SCR catalysts with high NOx conversion and moderate to low $N_2O$ formation (<0.1 g/kWh) appears to be mandatory to address the market requirements.

It is well-known that the combination of a Fe-zeolites and Cu-zeolites in one catalytic system can address this optimization requirements. For example, WO 2016/070090 A1 discloses a catalytic article comprising a first molecular sieve promoted with copper and a second molecular sieve promoted with iron. US 2011/0305614 A1 also discloses a catalyst, in particular a selective catalytic reduction (SCR) catalyst comprising a mixture of Cu-CHA and Fe-MFI. Finally, WO 2017/153894 A1 discloses a metal ion-exchanged molecular sieve, a Cu-CHA, which is ion-exchanged with at least one additional metal, preferably Al.

WO 2015/101930 A1, on the other hand, relates to a process for preparing a bimetal-exchanged zeolitic material having a BEA-type framework structure, wherein the process includes a first step of ion exchange with copper followed by a subsequent ion exchange step with iron. Similarly, WO 2017/134581 A1 discloses a process for preparing a zeolite having the CHA-type framework structure which is bimetal-exchanged with iron and copper, wherein the bimetal-exchanged zeolite is subsequently employed for preparing SCR washcoats.

WO 2018/10718 A relates to an in-slurry ion exchange method for preparing either a Cu-ion-exchanged zeolite or an Fe-ion-exchanged zeolite.

In view of the current developments, there therefore remains the need for catalysts which display increasing NOx conversion activities without at the same time leading to an increase in $N_2O$ emissions, in particular after having been subject to aging conditions during prolonged use.

BRIEF DESCRIPTION OF THE DRAWINGS

The FIGURE schematically illustrates an exhaust gas treatment system according to some embodiments of the present disclosure.

DETAILED DESCRIPTION

It was an object of the present invention to provide a selective catalytic reduction catalyst which permits to reduce significantly the $N_2O$ emissions, while maintaining high NOx conversion level under both standard SCR and fast SCR gas feed conditions as well as a process for preparing a selective catalytic reduction catalyst presenting such catalytic performances. Thus, it was surprisingly found that by additionally loading an Fe-CHA SCR catalyst slurry with a relatively small amount of copper, the $N_2O$ make of the resulting washcoated catalyst during the SCR process under standard SCR conditions could be substantially reduced. In addition thereto, it has unexpectedly been found that at the same time, said additional loading with copper leads to a substantial increase in the NOx conversion activity. Furthermore, it has surprisingly been found that the further loading of the Fe-CHA with copper leads to yet further substantial increases in the NOx conversion activity of the Fe-CHA catalyst. Yet further, it has quite unexpectedly been found that as opposed to the Fe-CHA catalysts which display a lower NOx activity after aging, in particular under standard SCR conditions, the loading of an Fe-CHA catalyst slurry with copper quite unexpectedly leads to a reversal of said tendency in the resulting washcoated catalyst, such that they perform even better after aging, in particular under standard SCR conditions.

Therefore, the present invention relates to a process for preparing a catalyst for the selective catalytic reduction of nitrogen oxide comprising
(1) providing a zeolitic material comprising $SiO_2$ and $X_2O_3$ in its framework structure, wherein X is a trivalent element;
(2) subjecting the zeolitic material provided in (1) to an ion exchange procedure with one or more iron(II) and/or iron (III) containing compounds;
(3) preparing a slurry comprising the Fe ion-exchanged zeolitic material obtained in (2), one or more copper(II) containing compounds, and a solvent system;
(4) providing a substrate and coating the slurry obtained in (3) onto the substrate;
(5) calcining the coated substrate obtained in (4);
wherein the zeolitic material has a framework type structure selected from the group consisting of LTA, AFT, AFV, SAV, SFW, TSC, FAU, MFI, BEA, FER, MOR, CHA, AEI, RTH, LEV, DDR, KFI, ERI, and AFX, including mixed structures of two or more thereof, preferably from the group consisting of CHA, AEI, RTH, and AFX, including mixed structures of two or more thereof, wherein more preferably the zeolitic material has a CHA and/or AEI-type framework type structure, preferably a CHA-type framework structure.

According to the present invention, it is preferred that X is selected from the group consisting of Al, B, In, Ga, and combinations of two or more thereof, more preferably from the group consisting of Al, B, In, and combinations of two or more thereof, wherein more preferably X stands for Al and/or B, X preferably being Al.

According to the present invention, it is preferred that the zeolitic material provided in (1) displays an $SiO_2:X_2O_3$ molar ratio in the range of from 1 to 200, more preferably from 5 to 120, more preferably from 10 to 80, more preferably from 15 to 50, more preferably from 20 to 40, and more preferably from 25 to 35.

According to the present invention, it is preferred that the zeolitic material provided in (1) comprises at most 1000 ppm, more preferably from 0 to 100 ppm, and more preferably from 0 to 10 ppm of iron, calculated as the element.

According to the present invention, it is preferred that the one or more iron(II) and/or iron(III) containing compounds are selected from the group consisting of iron sulfate, iron sulfite, iron hydrogensulfate, iron chloride, iron bromide, iron iodide, iron fluoride, iron perchlorate, iron nitrate, iron nitrite, iron phosphate, iron dihydrogenphosphate, iron hydrogenphosphate, iron carbonate, iron hydrogencarbonate, iron acetate, iron citrate, iron malonate, iron oxalate, iron tartrate, hexacyanoferrate salts, ferrocene, and ferrocenium salts, including combinations of two or more thereof, more preferably from the group consisting of iron (III) nitrate, iron (II) acetate, ammonium iron (III) citrate, iron (II) sulfate, and iron (II) oxalate, including combinations of two or more thereof, wherein more preferably iron (III) nitrate and/or iron (II) acetate is employed as the one or more iron(II) and/or iron(III) containing compounds.

According to the present invention, it is preferred that ion exchange in (2) is conducted in a solvent system comprising one or more solvents, wherein said one or more solvents are preferably selected from the group consisting of water, organic solvents, and mixtures thereof, more preferably from the group consisting of deionized water, alcohols, and mixtures thereof, more preferably from the group consisting of deionized water, methanol, ethanol, propanol, and mixtures thereof, wherein more preferably the one or more solvents comprise water, and wherein more preferably deionized water is used as the solvent system.

According to the present invention, it is preferred that ion exchange in (2) is conducted at a temperature in the range of from 20 to 100° C., more preferably from 30 to 90° C., more preferably from 40 to 80° C., more preferably from 50 to 70° C., and more preferably from 55 to 65° C. According to the present invention, it is preferred that ion exchange in (2) is conducted for a duration in the range of from 0.25 to 10 h, preferably from 0.5 to 5 h, more preferably from 1 to 3 h, and more preferably from 1.5 to 2.5 h.

According to the present invention, it is preferred that the Fe ion-exchanged zeolitic material obtained in (2) contains Fe, calculated as $Fe_2O_3$, in an amount ranging from 0.1 to 8 wt.-% based on 100 wt.-% of $SiO_2$, $Al_2O_3$, and Fe, calculated as $Fe_2O_3$, in the Fe ion-exchanged zeolitic material, more preferably from 0.5 to 5 wt.-%, more preferably from 1 to 3.5 wt.-%, more preferably from 1.5 to 3 wt.-%, more preferably from 2 to 2.8 wt.-%, and more preferably from 2.2 to 2.6 wt.-%.

According to the present invention, it is preferred that the one or more copper(II) containing compounds are selected from the group consisting of CuO, copper(II) chloride, copper(II) bromide, copper(II) perchlorate, copper(II) sulfite, copper(II) hydrogensulfate, copper(II) sulfate, copper(II) nitrite, copper(II) nitrate, copper(II) dihydrogenphosphate, copper(II) hydrogenphosphate, copper(II) phosphate, copper(II) hydrogencarbonate, copper(II) carbonate, copper (II) acetate, copper(II) citrate, copper(II) malonate, copper (II) oxalate, copper(II) tartrate, and mixtures of two or more thereof, more preferably from the group consisting of CuO, copper(II) chloride, copper(II) sulfate, copper(II) nitrate, copper(II) acetate, and mixtures of two or more thereof, wherein more preferably the copper(II) containing compound is CuO.

According to the present invention, it is preferred that the slurry obtained in (3) contains Cu, calculated as CuO, in an amount ranging from 0.05 to 8 wt.-% based on 100 wt.-% of the calcined slurry, more preferably from 0.05 to 8 wt.-%, more preferably from 0.1 to 5 wt.-%, more preferably from 0.3 to 3 wt.-%, more preferably from 0.5 to 2 wt.-%, more preferably from 0.7 to 1.5 wt.-%, more preferably from 0.8 to 1.2 wt.-%, and more preferably from 0.9 to 1.1 wt.-%.

According to the present invention, it is preferred that the solvent system in (3) comprises one or more solvents, wherein said one or more solvents are preferably selected from the group consisting of water, organic solvents, and mixtures thereof, more preferably from the group consisting of deionized water, alcohols, and mixtures thereof, more preferably from the group consisting of deionized water, methanol, ethanol, propanol, and mixtures thereof, wherein more preferably the one or more solvents comprise water, and wherein more preferably deionized water is used as the solvent system.

According to the present invention, it is preferred that the slurry obtained in (3) displays a solids content of 15 to 75 wt.-% based on 100 wt.-% of the slurry, more preferably from 20 to 65 wt.-%, more preferably from 25 to 60 wt.-%, more preferably from 30 to 55 wt.-%, more preferably from 33 to 50 wt.-%, more preferably from 35 to 45 wt.-%, and more preferably from 38 to 42 wt.-%.

According to the present invention, it is preferred that the slurry prepared in (3) further comprises one or more binders, more preferably one or more binders based on Al, Si, and/or Zr, preferably on Al and/or Zr, and more preferably based on Zr, wherein more preferably the slurry prepared in (3) further contains one or more sources of $ZrO_2$ as a binder, wherein the one or more sources of $ZrO_2$ preferably comprise one or more zirconium salts, more preferably one or more zirconium salts selected from the group consisting of zirconyl chloride, zirconium acetate, zirconium acetylacetonate, zirconium hydroxide, zirconium oxynitrate, zirconium carbonate, and zirconium oxychloride, including mixtures of two or more thereof, more preferably from the group consisting of zirconium acetate, zirconium acetylacetonate, zirconium hydroxide, and zirconium carbonate, including mixtures of two or more thereof, wherein more preferably the one or more zirconium salts comprise zirconium acetate, wherein more preferably the slurry prepared in (3) further comprises zirconium acetate as a binder. According to said particular and preferred embodiments, it is preferred that the slurry comprises the one or more binders in an amount ranging from 0.5 to 15 wt.-% based on 100 wt.-% of the calcined slurry, more preferably from 1 to 10 wt.-%, more preferably from 3 to 7 wt.-%, more preferably from 4 to 6 wt.-%, and more preferably from 4.5 to 5.5 wt.-%.

According to the present invention, it is preferred that the slurry prepared in (3) further comprises one or more sugars, wherein the one or more sugars preferably comprise sucrose, wherein more preferably sucrose is employed as the one or more sugars. According to said particular and preferred embodiments, it is preferred that the slurry comprises the one or more sugars in an amount of 10 wt.-% or less based on 100 wt.-% of the solvent system contained in the slurry, more preferably in an amount of 8 wt.-% or less, more preferably of 5 wt.-% or less, more preferably of 3 wt.-% or less, more preferably of 2 wt.-% or less, more preferably of 1 wt.-% or less, more preferably of 0.5 wt.-% or less, and more preferably of 0.1 wt.-% or less.

According to the present invention, it is preferred that prior to the coating of the slurry in (4), the slurry obtained in (3) is maintained at a temperature in the range of from 5 to 60° C., more preferably in the range of from 10 to 50° C., more preferably in the range of from 15 to 45° C., more preferably in the range of from 18 to 30° C., and more preferably in the range of from 20 to 25° C. According to said particular and preferred embodiments, it is further preferred that the slurry maintained at the temperature for a duration in the range of from 0.1 to 72 h, more preferably of from 0.5 to 48 h, more preferably of from 1 to 36 h, more preferably of from 3 to 30 h, more preferably of from 6 to 24 h, more preferably of from 10 to 20 h, more preferably of from 12 to 18 h, and more preferably of from 14 to 16 h.

According to the present invention, it is preferred that the substrate provided in (4) is a wall-flow or a flow-through substrate, preferably a wall-flow or a flow-through honeycomb substrate, and more preferably a flow-through honeycomb substrate.

According to the present invention, it is preferred that the substrate provided in (4) comprises, preferably consists of, a ceramic substance, wherein the ceramic substance preferably comprises, more preferably consists of, one or more of an alumina, a silica, a silicate, an aluminosilicate, a cordierite, a mullite, an aluminotitanate, a silicon carbide, a zirconia, a magnesia, more preferably a spinel, and a titania, more preferably one or more of a silicon carbide and a cordierite, more preferably a cordierite.

According to the present invention, it is preferred that after (4) and prior to calcination in (5), the coated substrate is dried in a gas atmosphere having a temperature in the range of from 80 to 250° C., more preferably in the range of from 90 to 200° C., more preferably in the range of from 100 to 150° C., more preferably in the range of from 110 to 130° C., the gas atmosphere more preferably being air. According to said particular and preferred embodiments, it is further preferred that drying is performed for a duration in the range of from 10 to 180 minutes, more preferably in the range of from 20 to 120 minutes, more preferably in the range of from 30 to 90 minutes, more preferably in the range of from 40 to 80 minutes.

According to the present invention, it is preferred that calcination in (5) is conducted at a temperature in the range of from 350 to 800° C., more preferably in the range of from 400 to 700° C., more preferably in the range of from 450 to 650° C., and more preferably in the range of from 500 to 600° C.

According to the present invention, it is preferred that calcination in (5) is conducted for a duration in the range of from in the range of from 10 to 180 minutes, more preferably in the range of from 20 to 120 minutes, more preferably in the range of from 30 to 90 minutes, more preferably in the range of from 40 to 80 minutes.

According to the present invention, it is preferred that calcination in (5) is conducted in a gas atmosphere containing air, wherein preferably calcination in (5) is conducted in air.

According to the present invention, it is preferred that the process consists of (1), (2), (3), (4) and (5).

The invention further relates to a catalyst for the selective catalytic reduction of nitrogen oxide obtainable and/or obtained according to the particular and preferred embodiments of the inventive process.

In addition thereto, as shown in the FIGURE, the present invention also relates to an exhaust gas treatment system for the treatment of exhaust gas exiting from an internal combustion engine, preferably from a diesel engine, the system comprising a catalyst for the selective catalytic reduction of nitrogen oxide according any of the particular and preferred embodiments of the present invention, and one or more of a diesel oxidation catalyst, an ammonia oxidation catalyst, a selective catalytic reduction catalyst, a catalyzed soot filter and a SCR/AMOx catalyst.

According to the present invention, a system comprising a diesel oxidation catalyst, a catalyzed soot filter and the catalyst for the selective catalytic reduction of nitrogen oxide according to any of the particular and preferred embodiments of the present invention is preferred, wherein the diesel oxidation catalyst is positioned upstream of the catalyzed soot filter and wherein the catalyzed soot filter is positioned upstream of the catalyst for the selective catalytic reduction of nitrogen oxide; wherein the diesel oxidation catalyst preferably is the first catalyst of the system and preferably no catalyst is present between the engine and the diesel oxidation catalyst. Furthermore, it is preferred that the system further comprises a selective catalytic reduction catalyst which is positioned downstream of the catalyst for the selective catalytic reduction of nitrogen oxide; wherein the system preferably further comprises an ammonia oxidation catalyst, said ammonia oxidation catalyst being positioned downstream of the selective catalytic reduction catalyst. Yet further and independently thereof, it is preferred that the system further comprises a reductant injector, wherein the reductant injector is positioned downstream of the catalyzed soot filter and upstream of the catalyst for the selective catalytic reduction of nitrogen oxide, wherein the reductant preferably is urea.

Alternatively, a system according to the present invention comprising a diesel oxidation catalyst, a catalyzed soot filter and the catalyst for the selective catalytic reduction of nitrogen oxide according to any of the particular and preferred embodiments of the present invention is preferred, wherein the diesel oxidation catalyst is positioned upstream of the catalyst for the selective catalytic reduction of nitrogen oxide and wherein the catalyst for the selective catalytic reduction of nitrogen oxide is positioned upstream of the catalyzed soot filter; wherein the diesel oxidation catalyst preferably is the first catalyst of the system and preferably no catalyst is present between the engine and the diesel oxidation catalyst.

According to said alternatively preferred embodiments, it is preferred that the system further comprises a selective catalytic reduction catalyst which is positioned downstream of the catalyst for the selective catalytic reduction of nitrogen oxide and upstream of the catalyzed soot filter; wherein the system preferably further comprises an ammonia oxidation catalyst, said ammonia oxidation catalyst being positioned downstream of the selective catalytic reduction catalyst and upstream of the catalyzed soot filter.

In addition thereto or independently thereof, it is preferred according to said alternatively preferred embodiments that the system further comprises a SCR/AMOx catalyst positioned downstream of the catalyzed soot filter, wherein the system preferably further comprises a reductant injector positioned upstream of the SCR/AMOx catalyst and downstream of the catalyzed soot filter, the reductant more preferably being urea.

Yet further in addition thereto or independently thereof, it is yet further preferred according to said alternatively preferred embodiments that they further comprise a reductant injector, the reductant injector being positioned downstream of the diesel oxidation catalyst and upstream of the catalyst for the selective catalytic reduction of nitrogen oxide, wherein the reductant preferably is urea.

Further alternatively, a system according to the present invention comprising the catalyst for the selective catalytic reduction of nitrogen oxide according to any of the particular and preferred embodiments of the present invention, and a catalyzed soot filter, wherein the catalyst for the selective catalytic reduction of nitrogen oxide is positioned upstream of the catalyzed soot filter; wherein the catalyst for the selective catalytic reduction of nitrogen oxide preferably is the first catalyst of the system and preferably no catalyst is present between the engine and the catalyst for the selective catalytic reduction of nitrogen oxide.

According to said alternatively preferred embodiments, it is preferred that the system further comprises a selective catalytic reduction catalyst which is positioned downstream of the catalyst for the selective catalytic reduction of nitrogen oxide and upstream of the catalyzed soot filter; wherein the system preferably further comprises an ammonia oxidation catalyst, said ammonia oxidation catalyst being positioned downstream of the selective catalytic reduction catalyst and upstream of the catalyzed soot filter.

In addition thereto or independently thereof, it is preferred according to said alternatively preferred embodiments that the system further comprises a first reductant injector, the first reductant injector being positioned upstream of the catalyst for the selective catalytic reduction of nitrogen oxide, wherein the reductant preferably is urea.

Yet further in addition thereto or independently thereof, it is yet further preferred according to said alternatively preferred embodiments that the system further comprises a SCR/AMOx catalyst positioned downstream of the catalyzed soot filter, wherein the system preferably further comprises a reductant injector positioned upstream of the SCR/AMOx catalyst and downstream of the catalyzed soot filter, the reductant more preferably being urea.

In addition to the aforementioned, the present invention further relates to a method for the selective catalytic reduction of nitrogen oxides, wherein the nitrogen ox-ides are comprised in an exhaust gas stream, said method comprising
(1) providing the exhaust gas stream, preferably from a diesel engine;
(2) passing the exhaust gas stream provided in (1) through a catalyst for the selective catalytic reduction according to any of the particular and preferred embodiments of the present invention or through an exhaust gas treatment system according to any of the particular and preferred embodiments of the present invention.

Finally, the present invention further relates to the use of a catalyst according to any of the particular and preferred embodiments of the present invention, or of an exhaust gas treatment system according to any of the particular and preferred embodiments of the present invention, for the selective catalytic reduction of nitrogen oxide, preferably of nitrogen oxide exiting from a diesel engine.

The present invention is further illustrated by the following set of embodiments and combinations of embodiments resulting from the dependencies and back-references as indicated. In particular, it is noted that in each instance where a range of embodiments is mentioned, for example in the context of a term such as "The . . . of any one of embodiments 1 to 4", every embodiment in this range is meant to be explicitly disclosed for the skilled person, i.e. the wording of this term is to be understood by the skilled person as being synonymous to "The . . . of any one of embodiments 1, 2, 3, and 4". Further, it is explicitly noted that the following set of embodiments is not the set of claims determining the extent of protection, but represents a suitably structured part of the description directed to general and preferred aspects of the present invention.

1. A process for preparing a catalyst for the selective catalytic reduction of nitrogen oxide comprising
   (1) providing a zeolitic material comprising $SiO_2$ and $X_2O_3$ in its framework structure, wherein X is a trivalent element;
   (2) subjecting the zeolitic material provided in (1) to an ion exchange procedure with one or more iron(II) and/or iron (III) containing compounds;
   (3) preparing a slurry comprising the Fe ion-exchanged zeolitic material obtained in (2), one or more copper (II) containing compounds, and a solvent system;
   (4) providing a substrate and coating the slurry obtained in (3) onto the substrate;
   (5) calcining the coated substrate obtained in (4);
   wherein the zeolitic material has a framework type structure selected from the group consisting of LTA, AFT, AFV, SAV, SFW, TSC, FAU, MFI, BEA, FER, MOR, CHA, AEI, RTH, LEV, DDR, KFI, ERI, and AFX, including mixed structures of two or more thereof, preferably from the group consisting of CHA, AEI, RTH, and AFX, including mixed structures of two or more thereof, wherein more preferably the zeolitic material has a CHA and/or AEI-type framework type structure, preferably a CHA-type framework structure.

2. The process of embodiment 1, wherein X is selected from the group consisting of Al, B, In, Ga, and combinations of two or more thereof, preferably from the group consisting of Al, B, In, and combinations of two or more thereof, wherein more preferably X stands for Al and/or B, X preferably being Al.

3. The process of embodiment 1 or 2, wherein the zeolitic material provided in (1) displays an $SiO_2:X_2O_3$ molar ratio in the range of from 1 to 200, preferably from 5 to 120, more preferably from 10 to 80, more preferably from 15 to 50, more preferably from 20 to 40, and more preferably from 25 to 35.

4. The process of any of embodiments 1 to 3, wherein the zeolitic material provided in (1) comprises at most 1000 ppm, preferably from 0 to 100 ppm, and more preferably from 0 to 10 ppm of iron, calculated as the element.

5. The process of any of embodiments 1 to 4, wherein the one or more iron(II) and/or iron(III) containing compounds are selected from the group consisting of iron sulfate, iron sulfite, iron hydrogensulfate, iron chloride, iron bromide, iron iodide, iron fluoride, iron perchlorate, iron nitrate, iron nitrite, iron phosphate, iron dihydrogenphosphate, iron hydrogenphosphate, iron carbonate, iron hydrogencarbonate, iron acetate, iron citrate, iron malonate, iron oxalate, iron tartrate, hexacyanoferrate salts, ferrocene, and ferrocenium salts, including combinations of two or more thereof, preferably from the group consisting of iron (III) nitrate, iron (II) acetate, ammonium iron (III) citrate, iron (II) sulfate, and iron (II) oxalate, including combinations of two or more thereof, wherein more preferably iron (III) nitrate and/or iron (II) acetate is employed as the one or more iron(II) and/or iron(III) containing compounds.

6. The process of any of embodiments 1 to 5, wherein ion exchange in (2) is conducted in a solvent system comprising one or more solvents, wherein said one or more solvents are preferably selected from the group consisting of water, organic solvents, and mixtures thereof, more preferably from the group consisting of deionized water, alcohols, and mixtures thereof, more preferably from the group consisting of deionized water, methanol, ethanol, propanol, and mixtures thereof, wherein more preferably the one or more solvents comprise water, and wherein more preferably deionized water is used as the solvent system.

7. The process of any of embodiments 1 to 6, wherein ion exchange in (2) is conducted at a temperature in the range of from 20 to 100° C., preferably from 30 to 90° C., more preferably from 40 to 80° C., more preferably from 50 to 70° C., and more preferably from 55 to 65° C.

8. The process of any of embodiments 1 to 7, wherein ion exchange in (2) is conducted for a duration in the range of from 0.25 to 10 h, preferably from 0.5 to 5 h, more preferably from 1 to 3 h, and more preferably from 1.5 to 2.5 h.

9. The process of any of embodiments 1 to 8, wherein the Fe ion-exchanged zeolitic material obtained in (2) contains Fe, calculated as $Fe_2O_3$, in an amount ranging from 0.1 to 8 wt.-% based on 100 wt.-% of $SiO_2$, $Al_2O_3$, and Fe, calculated as $Fe_2O_3$, in the Fe ion-exchanged zeolitic material, preferably from 0.5 to 5 wt.-%, more preferably from 1 to 3.5 wt.-%, more preferably from 1.5 to 3 wt.-%, more preferably from 2 to 2.8 wt.-%, and more preferably from 2.2 to 2.6 wt.-%.

10. The process of any of embodiments 1 to 9, wherein the one or more copper(II) containing compounds are selected from the group consisting of CuO, copper(II) chloride, copper(II) bromide, copper(II) perchlorate, copper(II) sulfite, copper(II) hydrogensulfate, copper (II) sulfate, copper(II) nitrite, copper(II) nitrate, copper (II) dihydrogenphosphate, copper(II) hydrogenphosphate, copper(II) phosphate, copper(II) hydrogencarbonate, copper(II) carbonate, copper(II) acetate, copper(II) citrate, copper(II) malonate, copper (II) oxalate, copper(II) tartrate, and mixtures of two or more thereof, preferably from the group consisting of CuO, copper(II) chloride, copper(II) sulfate, copper(II) nitrate, copper(II) acetate, and mixtures of two or more thereof, wherein more preferably the copper(II) containing compound is CuO.

11. The process of any of embodiments 1 to 10, wherein the slurry obtained in (3) contains Cu, calculated as CuO, in an amount ranging from 0.05 to 8 wt.-% based on 100 wt.-% of the calcined slurry, preferably from 0.05 to 8 wt.-%, more preferably from 0.1 to 5 wt.-%, more preferably from 0.3 to 3 wt.-%, more preferably from 0.5 to 2 wt.-%, more preferably from 0.7 to 1.5 wt.-%, more preferably from 0.8 to 1.2 wt.-%, and more preferably from 0.9 to 1.1 wt.-%.

12. The process of any of embodiments 1 to 11, wherein the solvent system in (3) comprises one or more solvents, wherein said one or more solvents are preferably selected from the group consisting of water, organic solvents, and mixtures thereof, more preferably from the group consisting of deionized water, alcohols, and mixtures thereof, more preferably from the group consisting of deionized water, methanol, ethanol, propanol, and mixtures thereof, wherein more preferably the one or more solvents comprise water, and wherein more preferably deionized water is used as the solvent system.

13. The process of any of embodiments 1 to 12, wherein the slurry obtained in (3) displays a solids content of 15 to 75 wt.-% based on 100 wt.-% of the slurry, preferably from 20 to 65 wt.-%, more preferably from 25 to 60 wt.-%, more preferably from 30 to 55 wt.-%, more preferably from 33 to 50 wt.-%, more preferably from 35 to 45 wt.-%, and more preferably from 38 to 42 wt.-%.

14. The process of any of embodiments 1 to 13, wherein the slurry prepared in (3) further comprises one or more binders, preferably one or more binders based on Al, Si, and/or Zr, preferably on Al and/or Zr, and more preferably based on Zr, wherein more preferably the slurry prepared in (3) further contains one or more sources of $ZrO_2$ as a binder, wherein the one or more sources of $ZrO_2$ preferably comprise one or more zirconium salts, more preferably one or more zirconium salts selected from the group consisting of zirconyl chloride, zirconium acetate, zirconium acetylacetonate, zirconium hydroxide, zirconium oxynitrate, zirconium carbonate, and zirconium oxychloride, including mixtures of two or more thereof, more preferably from the group consisting of zirconium acetate, zirconium acetylacetonate, zirconium hydroxide, and zirconium carbonate, including mixtures of two or more thereof, wherein more preferably the one or more zirconium salts comprise zirconium acetate, wherein more preferably the slurry prepared in (3) further comprises zirconium acetate as a binder.

15. The process of embodiment 14, wherein the slurry comprises the one or more binders in an amount ranging from 0.5 to 15 wt.-% based on 100 wt.-% of the calcined slurry, preferably from 1 to 10 wt.-%, more preferably from 3 to 7 wt.-%, more preferably from 4 to 6 wt.-%, and more preferably from 4.5 to 5.5 wt.-%.

16. The process of any of embodiments 1 to 15, wherein the slurry prepared in (3) further comprises one or more sugars, wherein the one or more sugars preferably comprise sucrose, wherein more preferably sucrose is employed as the one or more sugars.

17. The process of embodiment 16, wherein the slurry comprises the one or more sugars in an amount of 10 wt.-% or less based on 100 wt.-% of the solvent system contained in the slurry, preferably in an amount of 8 wt.-% or less, more preferably of 5 wt.-% or less, more preferably of 3 wt.-% or less, more preferably of 2 wt.-% or less, more preferably of 1 wt. % or less, more preferably of 0.5 wt.-% or less, and more preferably of 0.1 wt.-% or less.

18. The process of any of embodiments 1 to 17, wherein prior to the coating of the slurry in (4), the slurry obtained in (3) is maintained at a temperature in the range of from 5 to 60° C., preferably in the range of from 10 to 50° C., more preferably in the range of from 15 to 45° C., more preferably in the range of from 18 to 30° C., and more preferably in the range of from 20 to 25° C.

19. The process of embodiment 18, wherein the slurry maintained at the temperature for a duration in the range of from 0.1 to 72 h, preferably of from 0.5 to 48 h, more preferably of from 1 to 36 h, more preferably of from 3 to 30 h, more preferably of from 6 to 24 h, more preferably of from 10 to 20 h, more preferably of from 12 to 18 h, and more preferably of from 14 to 16 h.

20. The process of any of embodiments 1 to 19, wherein the substrate provided in (4) is a wall-flow or a flow-through substrate, preferably a wall-flow or a flow-through honeycomb substrate, and more preferably a flow-through honeycomb substrate.

21. The process of any of embodiments 1 to 20, wherein the substrate provided in (4) comprises, preferably consists of, a ceramic substance, wherein the ceramic substance preferably comprises, more preferably consists of, one or more of an alumina, a silica, a silicate, an aluminosilicate, a cordierite, a mullite, an aluminotitanate, a silicon carbide, a zirconia, a magnesia, more preferably a spinel, and a titania, more preferably one or more of a silicon carbide and a cordierite, more preferably a cordierite.

22. The process of any of embodiments 1 to 21, wherein after (4) and prior to calcination in (5), the coated substrate is dried in a gas atmosphere having a temperature in the range of from 80 to 250° C., preferably in the range of from 90 to 200° C., more preferably in the range of from 100 to 150° C., more preferably in the range of from 110 to 130° C., the gas atmosphere more preferably being air.

23. The process of embodiment 22, wherein drying is performed for a duration in the range of from 10 to 180 minutes, preferably in the range of from 20 to 120 minutes, more preferably in the range of from 30 to 90 minutes, more preferably in the range of from 40 to 80 minutes.

24. The process of any of embodiments 1 to 23, wherein calcination in (5) is conducted at a temperature in the range of from 350 to 800° C., preferably in the range of from 400 to 700° C., more preferably in the range of from 450 to 650° C., and more preferably in the range of from 500 to 600° C.

25. The process of any of embodiments 1 to 24, wherein calcination in (5) is conducted for a duration in the range of from in the range of from 10 to 180 minutes, preferably in the range of from 20 to 120 minutes, more preferably in the range of from 30 to 90 minutes, more preferably in the range of from 40 to 80 minutes.

26. The process of any of embodiments 1 to 25, wherein calcination in (5) is conducted in a gas atmosphere containing air, wherein preferably calcination in (5) is conducted in air.

27. The process of any of embodiments 1 to 26, wherein the process consists of (1), (2), (3), (4) and (5).

28. A catalyst for the selective catalytic reduction of nitrogen oxide obtainable and/or obtained according to the process of any of embodiments 1 to 27.

29. An exhaust gas treatment system for the treatment of exhaust gas exiting from an internal combustion engine, preferably from a diesel engine, the system comprising a catalyst for the selective catalytic reduction of nitrogen oxide according embodiment 28 and one or more of a diesel oxidation catalyst, an ammonia oxidation catalyst, a selective catalytic reduction catalyst, a catalyzed soot filter and a SCR/AMOx catalyst.

30. The system of embodiment 29 comprising a diesel oxidation catalyst, a catalyzed soot filter and the catalyst for the selective catalytic reduction of nitrogen oxide, wherein the diesel oxidation catalyst is positioned upstream of the catalyzed soot filter and wherein the catalyzed soot filter is positioned upstream of the catalyst for the selective catalytic reduction of nitrogen oxide; wherein the diesel oxidation catalyst preferably is the first catalyst of the system and preferably no catalyst is present between the engine and the diesel oxidation catalyst.

31. The system of embodiment 30, wherein the system further comprises a selective catalytic reduction catalyst which is positioned downstream of the catalyst for the selective catalytic reduction of nitrogen oxide; wherein the system preferably further comprises an ammonia oxidation catalyst, said ammonia oxidation catalyst being positioned downstream of the selective catalytic reduction catalyst.

32. The system of embodiment 30 or 31 further comprising a reductant injector, the reductant injector being positioned downstream of the catalyzed soot filter and upstream of the catalyst for the selective catalytic reduction of nitrogen oxide, wherein the reductant preferably is urea.

33. The system of embodiment 29 comprising a diesel oxidation catalyst, a catalyzed soot filter and the catalyst for the selective catalytic reduction of nitrogen oxide, wherein the diesel oxidation catalyst is positioned upstream of the catalyst for the selective catalytic reduction of nitrogen oxide and wherein the catalyst for the selective catalytic reduction of nitrogen oxide is positioned upstream of the catalyzed soot filter; wherein the diesel oxidation catalyst preferably is the first catalyst of the system and preferably no catalyst is present between the engine and the diesel oxidation catalyst.

34. The system of embodiment 33, wherein the system further comprises a selective catalytic reduction catalyst which is positioned downstream of the catalyst for the selective catalytic reduction of nitrogen oxide and upstream of the catalyzed soot filter;
wherein the system preferably further comprises an ammonia oxidation catalyst, said ammonia oxidation catalyst being positioned downstream of the selective catalytic reduction catalyst and upstream of the catalyzed soot filter.

35. The system of embodiment 33 or 34, wherein the system further comprises a SCR/AMOx catalyst positioned downstream of the catalyzed soot filter, wherein the system preferably further comprises a reductant injector positioned upstream of the SCR/AMOx catalyst and downstream of the catalyzed soot filter, the reductant more preferably being urea.

36. The system of any one of embodiments 33 to 35 further comprising a reductant injector, the reductant injector being positioned downstream of the diesel oxidation catalyst and upstream of the catalyst for the selective catalytic reduction of nitrogen oxide, wherein the reductant preferably is urea.

37. The system of embodiment 29 comprising the catalyst for the selective catalytic reduction of nitrogen oxide and a catalyzed soot filter, wherein the catalyst for the selective catalytic reduction of nitrogen oxide is positioned upstream of the catalyzed soot filter; wherein the catalyst for the selective catalytic reduction of nitrogen oxide preferably is the first catalyst of the system and preferably no catalyst is present between the engine and the catalyst for the selective catalytic reduction of nitrogen oxide.

38. The system of embodiment 37, wherein the system further comprises a selective catalytic reduction catalyst which is positioned downstream of the catalyst for the selective catalytic reduction of nitrogen oxide and upstream of the catalyzed soot filter;
wherein the system preferably further comprises an ammonia oxidation catalyst, said ammonia oxidation catalyst being positioned downstream of the selective catalytic reduction catalyst and upstream of the catalyzed soot filter.

39. The system of embodiment 37 or 38 further comprising a first reductant injector, the first reductant injector being positioned upstream of the catalyst for the selective catalytic reduction of nitrogen oxide, wherein the reductant preferably is urea.

40. The system of any one of embodiments 37 to 39, wherein the system further comprises a SCR/AMOx catalyst positioned downstream of the catalyzed soot filter, wherein the system preferably further comprises a reductant injector positioned upstream of the SCR/AMOx catalyst and downstream of the catalyzed soot filter, the reductant more preferably being urea.

41. A method for the selective catalytic reduction of nitrogen oxides, wherein the nitrogen oxides are comprised in an exhaust gas stream, said method comprising
   (1) providing the exhaust gas stream, preferably from a diesel engine;
   (2) passing the exhaust gas stream provided in (1) through a catalyst for the selective catalytic reduction according to embodiment 28 or through an exhaust gas treatment system according to any of embodiments 29 to 40.

42. Use of a catalyst according to embodiment 28 or of an exhaust gas treatment system according to any of embodiments 29 to 40 for the selective catalytic reduction of nitrogen oxide, preferably of nitrogen oxide exiting from a diesel engine.

EXPERIMENTAL SECTION

Reference Example 1: Preparation of a Zeolitic Material Having the CHA-Type Framework Structure Chabazite was prepared according to the procedure described in Comparative Example 1 and step 2.1 of Comparative Example 2 of WO 2011/064186 A1.

Reference Example 2: Fe-CHA Prepared According to a Liquid Phase Ion-Exchange (LPIE) Process The zeolitic material obtained according to Reference Example 1 was ion exchanged with iron in accordance with Example 3 of U.S. Pat. No. 9,486,792 B2. The ion exchange was performed such as to obtain a Fe content in the Fe-CHA zeolitic material, calculated as $Fe_2O_3$, of 2.45 weight-% based on the weight of Fe-CHA.

Reference Example 3: General Coating Method

In order to coat a flow-through substrate with a coating, the flow-through substrate was immersed vertically in a portion of a given slurry for a specific length of the substrate which was equal to the targeted length of the coating to be applied. In this manner, the washcoat contacted the walls of the substrate. The sample was left in the slurry for a specific period of time, usually for 1-10 seconds. The substrate was then removed from the slurry, and excess slurry was removed from the substrate by allowing it to drain from the substrate, then by blowing with compressed air (against the direction of slurry penetration).

Comparative Example 1: Preparation of an SCR Catalyst Containing Fe-CHA

A washcoat slurry was prepared by mixing water and Fe-CHA from Reference Example 2 to generate a target 40% by weight solids slurry containing binder. A catalytic coating containing this mixture was deposited via the washcoat process of Reference Example 5 on cellular flowthrough ceramic monolith having a cell density of 400 cpsi and a wall thickness of 6 mil. The coated monolith was dried at 110° C. The coating process provided a catalyst loading of 2.1 g/in$^3$.

More specifically, for preparing the washcoat slurry, an aqueous solution of zirconyl acetate was mixed with the Fe-CHA zeolite from Reference Example 2 (5 wt.-% Zr-OAc based on 100 wt.-% of the calcined slurry), and deionized water to form a slurry. The slurry was then disposed over the full length of an uncoated flow-through honeycomb cordierite monolith substrate. Said substrate was coated according to the method described in Reference Example 5. Afterwards, the substrate was dried and then calcined at 550° C. for 60 minutes.

Example 1: Preparation of an SCR Catalyst Containing Fe-CHA and 0.5 wt.-% Cu Calculated as CuO An in-slurry ion exchange process was used to add copper to the Fe-CHA from Reference Example 2 to form a Fe/Cu promoted zeolite (an in-slurry ion-exchange (ISIE) process as described in EP 3 549 913 A1 was used to this effect). In this example, the source of additional Cu, Cu(II) oxide, was used to add Cu content to the required level in the slurry, and subsequently mixed thoroughly for in-slurry ion-exchange to be completed.

More specifically, a coated ceramic monolith was prepared according to Comparative Example 1, wherein when preparing the washcoat slurry, Cu(II) oxide was further added in an amount such as to obtain a Cu content in the slurry, calculated as CuO, of 0.5 weight-% based on the weight of the calcined slurry. To this effect, Fe-CHA was mixed with Cu(II) oxide and subsequently with 5 wt % Zr-oAc, and sugar (sucrose; less than 3 wt.-% based on 100 wt.-% of the water used to make the slurry) was then added. The slurry was then let sit overnight before being coated into flow-through substrate. The coated substrate was then calcined at 550° C. for 1 h.

Example 2: Preparation of an SCR Catalyst Containing Fe-CHA and 1.0 wt.-% Cu

A coated ceramic monolith was prepared according to the procedure described in Example 1, wherein the Cu(II) oxide was further added in an amount such as to obtain a Cu content in the slurry, calculated as CuO, of 1.0 weight-% based on the weight of the calcined slurry.

Example 3: Preparation of an SCR Catalyst Containing Fe-CHA and 1.6 wt.-% Cu

A coated ceramic monolith was prepared according to the procedure described in Example 1, wherein the Cu(II) oxide was further added in an amount such as to obtain a Cu content in the slurry, calculated as CuO, of 1.6 weight-% based on the weight of the calcined slurry.

Example 4: Preparation of an SCR Catalyst Containing Fe-CHA and 2.0 wt.-% Cu

A coated ceramic monolith was prepared according to the procedure described in Example 1, wherein the Cu(II) oxide was further added in an amount such as to obtain a Cu content in the slurry, calculated as CuO, of 2.0 weight-% based on the weight of the calcined slurry.

Example 5: Testing of the Catalysts in NOx Conversion and N₂O Formation

The catalysts of Comparative Example 1 and of Examples 1 to 4 were tested in the fresh and hydrothermally aged states. Hydrothermal treatment of the coated monoliths was performed with steam, and was achieved by allowing an approximately 10% $O_2$, 10% $H_2O$ in $N_2$ flow over the monolith at the required temperature (650° C.) at space velocity of 9000 $h^{-1}$ for the specified amount of time (50 hours).

SCR Testing Conditions:
  Space velocity (SV)=80 k $h^{-1}$, Temperatures: 250° C., 200° C.
  Standard SCR Gas feed: 550 ppm $NH_3$, 500 ppm NO, 5% $H_2O$, 10% $O_2$, balance $N_2$
  Fast SCR Gas feed: 500 ppm $NH_3$, 250 ppm NO, 250 ppm $NO_2$, 5% $H_2O$, 10% $O_2$, balance $N_2$ The results from catalyst testing of the catalyst samples in the fresh and aged states under standard and fast SCR conditions are shown in Tables 1 and 2 below, respectively.

TABLE 1

Results from catalyst testing under standard SCR conditions.

| | Catalyst composition | | | Standard SCR conditions | | | |
| | | | | Fresh catalyst | | Aged catalyst | |
| Example | Zeolite | Wt % CuO | Wt % Fe2O3 | 250 C. NOx conversion | Max N2O (ppm) | 250 C. NOx conversion | Max N₂O (ppm) |
|---|---|---|---|---|---|---|---|
| Ex. 4 | Cu-ISIE FeCHA | 2.0 wt % | 2.4 wt % | 41% | 5.3 ppm | 55% | 9.6 ppm |
| Ex. 3 | Cu-ISIE FeCHA | 1.6 wt % | 2.4 wt % | 40% | 6.1 ppm | 47% | 5.9 ppm |
| Ex. 2 | Cu-ISIE FeCHA | 1.0 wt % | 2.4 wt % | 25% | 2.7 ppm | 40% | 3.0 ppm |
| Ex. 1 | Cu-ISIE FeCHA | 0.5 wt % | 2.4 wt % | 21% | 1.7 ppm | 21% | 1.7 ppm |
| Comp. Ex. 1 | FeCHA | — | 2.4 wt % | 16% | 2.5 ppm | 13% | 2.5 ppm |

TABLE 2

Results from catalyst testing under fast SCR conditions.

| | Catalyst composition | | | Fast SCR conditions | | | |
| | | | | Fresh catalyst | | Aged catalyst | |
| Example | Zeolite | Wt % CuO | Wt % Fe2O3 | 200 C. NOx conversion | Max N2O (ppm) | 200 C. NOx conversion | Max N₂O (ppm) |
|---|---|---|---|---|---|---|---|
| Ex. 4 | Cu-ISIE FeCHA | 2.0 wt % | 2.4 wt % | 75% | 10.7 ppm | 71% | 15.1 ppm |
| Ex. 3 | Cu-ISIE FeCHA | 1.6 wt % | 2.4 wt % | 62% | 12.6 ppm | 53% | 11.2 ppm |
| Ex. 2 | Cu-ISIE FeCHA | 1.0 wt % | 2.4 wt % | 44% | 8.2 ppm | 59% | 9.1 ppm |
| Ex. 1 | Cu-ISIE FeCHA | 0.5 wt % | 2.4 wt % | 25% | 5.5 ppm | 28% | 6.0 ppm |
| Comp. Ex. 1 | FeCHA | — | 2.4 wt % | 25% | 3.0 ppm | 25% | 4.8 ppm |

Thus, as may be taken from Table 1, it has surprisingly found that by additionally loading the Fe-CHA SCR catalyst slurry with 0.5 wt.-% of copper, the $N_2O$ make of the resulting catalyst during the SCR process under standard SCR conditions could be substantially reduced. Furthermore, it has unexpectedly been found that at the same time, said additional loading with copper leads to a substantial increase in the NOx conversion activity under both standard and fast SCR conditions compared to the Fe-CHA catalyst of Comparative Example 1. In addition thereto, it has been found that the loading of the Fe-CHA catalyst slurry with yet more copper leads to further substantial increases in the NOx conversion activity of the resulting catalyst compared to the Fe-CHA catalyst of Comparative Example 1.

A further point of interest concerns the effect of prolonged use of the catalyst under SCR conditions, wherein said effect is simulated by the aging treatment. Thus as may be taken from the results obtained using the Fe-CHA catalyst from Comparative Example 1, aging leads to a substantial decrease in SCR activity under standard conditions, whereas under fast SCR conditions, the aged catalyst displays a drastic increase in $N_2O$ emissions. Surprisingly, the inventive catalyst wherein the slurry was loaded with 0.5 wt.-% copper during preparation thereof does not show any decrease in NOx activity. Yet more surprisingly, the inventive samples with yet higher loadings of copper even display a substantial increase in SCR activity after aging, in particular under standard SCR conditions. As for the performance of the inventive samples under fast SCR conditions, it has unexpectedly found that the drastic increase in $N_2O$ emissions displayed by the Fe-CHA catalyst after aging is not observed in the inventive catalysts, which only display a slight increase in $N_2O$ emissions compared to the fresh catalysts, despite the substantial increase in NOx activity which may be observed for the inventive catalyst under fast SCR conditions, in particular after aging.

Accordingly, a highly improved catalyst has surprisingly been obtained according to the present invention by loading an Fe-CHA SCR catalyst slurry with varying amounts of copper.

CITED LITERATURE

WO 2016/070090 A1
US 2011/0305614 A1
WO 2017/153894 A1
WO 2015/101930 A1
WO 2017/134581 A1
WO 2018/10718 A
WO 2011/064186 A1
U.S. Pat. No. 9,486,792 B2

The invention claimed is:

1. A process for preparing a catalyst for the selective catalytic reduction of nitrogen oxide comprising
    (1) providing a zeolitic material comprising $SiO_2$ and $X_2O_3$ in its framework structure, wherein X is a trivalent element;
    (2) subjecting the zeolitic material provided in (1) to an ion exchange procedure with one or more iron (II) and/or iron (III) containing compounds to obtain a Fe ion-exchanged zeolite material through a liquid phase ion-exchange (LPIE) process;
    (3) preparing a slurry comprising the Fe ion-exchanged zeolitic material obtained in (2), one or more copper (II) containing compounds, and a solvent system, to add copper to the Fe ion-exchanged zeolite material obtained in (2) through an in-slurry ion-exchange (ISIE) process;
    (4) providing a substrate and coating the slurry obtained in (3) onto the substrate;
    (5) calcining the coated substrate obtained in (4);
    wherein the zeolitic material has a framework structure selected from the group consisting of LTA, AFT, AFV, SAV, SFW, TSC, FAU, MFI, BEA, FER, MOR, CHA, AEI, RTH, LEV, DDR, KFI, ERI, and AFX, including mixed structures of two or more thereof.

2. The process of claim 1, wherein X is selected from the group consisting of Al, B, In, Ga, and combinations of two or more thereof.

3. The process of claim 1, wherein the Fe ion-exchanged zeolitic material obtained in (2) contains Fe, calculated as $Fe_2O_3$, in an amount ranging from 0.1 to 8 wt.-% based on 100 wt.-% of $SiO_2$, $Al_2O_3$, and Fe, calculated as $Fe_2O_3$, in the Fe ion-exchanged zeolitic material.

4. The process of claim 1, wherein the slurry obtained in (3) contains Cu, calculated as CuO, in an amount ranging from 0.05 to 8 wt.-% based on 100 wt.-% of the calcined slurry.

5. The process of claim 1, wherein the slurry prepared in (3) further comprises one or more binders.

6. The process of claim 5, wherein the slurry comprises the one or more binders in an amount ranging from 0.5 to 15 wt.-% based on 100 wt.-% of the calcined slurry.

7. The process of claim 1, wherein the slurry prepared in (3) further comprises one or more sugars.

8. The process of claim 7, wherein the slurry comprises the one or more sugars in an amount of 10 wt.-% or less based on 100 wt.-% of the solvent system contained in the slurry.

9. A catalyst for the selective catalytic reduction of nitrogen oxide obtainable and/or obtained according to the process of claim 1.

10. An exhaust gas treatment system for the treatment of exhaust gas exiting from an internal combustion engine, the system comprising a catalyst for the selective catalytic reduction of nitrogen oxide according claim 9 and one or more of a diesel oxidation catalyst, an ammonia oxidation catalyst, a selective catalytic reduction catalyst, a catalyzed soot filter and a SCR/AMOx catalyst.

11. The system of claim 10 comprising a diesel oxidation catalyst, a catalyzed soot filter and the catalyst for the selective catalytic reduction of nitrogen oxide, wherein the diesel oxidation catalyst is positioned upstream of the catalyzed soot filter and wherein the catalyzed soot filter is positioned upstream of the catalyst for the selective catalytic reduction of nitrogen oxide.

12. The system of claim 10 comprising a diesel oxidation catalyst, a catalyzed soot filter and the catalyst for the selective catalytic reduction of nitrogen oxide, wherein the diesel oxidation catalyst is positioned upstream of the catalyst for the selective catalytic reduction of nitrogen oxide and wherein the catalyst for the selective catalytic reduction of nitrogen oxide is positioned upstream of the catalyzed soot filter.

13. The system of claim 10 comprising the catalyst for the selective catalytic reduction of nitrogen oxide and a catalyzed soot filter, wherein the catalyst for the selective catalytic reduction of nitrogen oxide is positioned upstream of the catalyzed soot filter.

14. A method for the selective catalytic reduction of nitrogen oxides, wherein the nitrogen ox-ides are comprised in an exhaust gas stream, said method comprising (1) providing the exhaust gas stream;
(2) passing the exhaust gas stream provided in (1) through a catalyst for the selective catalytic reduction according to claim 9.

15. A method for the selective catalytic reduction of nitrogen oxides, wherein the nitrogen oxides are comprised in an exhaust gas stream, said method comprising
(1) providing the exhaust gas stream;
(2) passing the exhaust gas stream provided in (1) through a catalyst for the exhaust gas treatment system according to claim 10.

* * * * *